United States Patent
Fan et al.

(10) Patent No.: US 10,117,207 B2
(45) Date of Patent: Oct. 30, 2018

(54) OVER-THE-AIR PHASE SYNCHRONIZATION FOR RECIPROCITY-BASED COMP JOINT TRANSMISSION

(71) Applicant: QUALCOMM Incorporated, San Diego, CA (US)

(72) Inventors: Zhifei Fan, San Diego, CA (US); Taesang Yoo, San Diego, CA (US); Dinkar Vasudevan, New Delhi (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/830,821

(22) Filed: Dec. 4, 2017

(65) Prior Publication Data
US 2018/0167903 A1    Jun. 14, 2018

Related U.S. Application Data

(60) Provisional application No. 62/432,179, filed on Dec. 9, 2016.

(51) Int. Cl.
| | | |
|---|---|---|
| H04B 7/005 | (2006.01) |
| H04B 7/01 | (2006.01) |
| H04B 7/015 | (2006.01) |
| H04B 15/00 | (2006.01) |
| H04W 56/00 | (2009.01) |
| H04B 1/403 | (2015.01) |
| H04B 7/024 | (2017.01) |
| H04L 25/02 | (2006.01) |
| H04L 5/00 | (2006.01) |

(52) U.S. Cl.
CPC ........ *H04W 56/0035* (2013.01); *H04B 1/403* (2013.01); *H04B 7/024* (2013.01); *H04W 56/0015* (2013.01); *H04L 5/0035* (2013.01); *H04L 25/0202* (2013.01)

(58) Field of Classification Search
CPC .... H04W 56/0035; H04B 1/403; H04B 7/024
See application file for complete search history.

(56) References Cited

U.S. PATENT DOCUMENTS

| | | | |
|---|---|---|---|
| 2010/0080154 A1* | 4/2010 | Noh | H04B 7/0452 370/310 |
| 2012/0243424 A1 | 9/2012 | Wang | |
| 2013/0029586 A1* | 1/2013 | Wang | H04L 25/0204 455/3.01 |

OTHER PUBLICATIONS

International Search Report and Written Opinion—PCT/US2017/064615—ISA/EPO—dated Mar. 8, 2018.

(Continued)

*Primary Examiner* — Nguyen Vo
(74) *Attorney, Agent, or Firm* — Liem T. Do

(57) ABSTRACT

Over-the-air (OTA) phase synchronization for reciprocity-based coordinated multipoint (CoMP) joint transmission is disclosed. Phase synchronization reference signals (PSRS) are transmitted within a CoMP operation that can be used to determine the phase drifts of the transmit and receive chains of the base stations. These phase drifts can then be used to obtain a relative phase drift between the uplink and downlink channels. When estimating the uplink channel from the sounding reference signals (SRS), the relative phase drift may be applied to estimate the downlink channel as well. The OTA phase synchronization may be performed with a user equipment (UE)-assisted or inter-base station procedures.

30 Claims, 13 Drawing Sheets

(56) References Cited

OTHER PUBLICATIONS

Jin J., et al., "Inter-Cell Antenna Calibration for TDD CoMP Systems", 2014 XXXI th URSI General Assembly and Scientific Symposium (URSI GASS), IEEE, XP032663847, Aug. 16, 2014 (Aug. 16, 2014), pp. 1-4.

National Instruments: "Over the Air Calibration for Reciprocity Based MIMO", 3GPP Draft, R1-1609725, 3rd Generation Partnership Project (3GPP), Mobile Competence Centre; 650, Route Des Lucioles; F-06921, Sophia-Antipolis Ced, vol. RAN WG1, No. Lisbon, Portugal; (Oct. 10, 2016-Oct. 14, 2016) XP051158575, Sep. 30, 2016 (Sep. 30, 2016), pp. 1-8.

\* cited by examiner

OVER-THE-AIR PHASE SYNCHRONIZATION FOR RECIPROCITY-BASED COMP JOINT TRANSMISSION

CROSS-REFERENCE TO RELATED APPLICATIONS

This application claims the benefit of U.S. Provisional Patent Application No. 62/432,179, entitled, "OVER-THE-AIR PHASE SYNCHRONIZATION FOR RECIPROCITY-BASED COMP JOINT TRANSMISSION," filed on Dec. 9, 2016, which is expressly incorporated by reference herein in its entirety.

BACKGROUND

Field

Aspects of the present disclosure relate generally to wireless communication systems, and more particularly, to over-the-air (OTA) phase synchronization for reciprocity-based coordinated multipoint (CoMP) joint transmission.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes transmitting, by a base station, a first phase synchronization reference signal (PSRS), wherein the base station is one of a plurality of cooperating base stations in a coordinating set of base stations, receiving, at the base station, a second PSRS, measuring, at the base station, a receive chain phase drift based on the received second PSRS, obtaining, at the base station, a transmit chain phase drift based on the first PSRS, determining, by the base station, a relative phase drift between a downlink channel and an uplink channel using the receive chain phase drift and the transmit chain phase drift, determining, by the base station, a relative coordinating phase drift among all cooperating base stations in the coordinating set of base stations, generating, by the base station, an uplink channel estimate based on a sounding reference signal (SRS) received from a user equipment (UE), and generating, by the base station, a downlink channel estimate based on the uplink channel estimate, the relative phase drift, and the relative coordinating phase drift.

In an additional aspect of the disclosure, an apparatus configured for wireless communication including means for transmitting, by a base station, a first PSRS, wherein the base station is one of a plurality of cooperating base stations in a coordinating set of base stations, means for receiving, at the base station, a second PSRS, means for measuring, at the base station, a receive chain phase drift based on the received second PSRS, obtaining, at the base station, a transmit chain phase drift based on the first PSRS, means for determining, by the base station, a relative phase drift between a downlink channel and an uplink channel using the receive chain phase drift and the transmit chain phase drift, means for determining, by the base station, a relative coordinating phase drift among all cooperating base stations in the coordinating set of base stations, means for generating, by the base station, an uplink channel estimate based on a SRS received from a UE, and means for generating, by the base station, a downlink channel estimate based on the uplink channel estimate, the relative phase drift, and the relative coordinating phase drift.

In an additional aspect of the disclosure, a non-transitory computer-readable medium having program code recorded thereon. The program code further includes code to transmit, by a base station, a first PSRS, wherein the base station is one of a plurality of cooperating base stations in a coordinating set of base stations, code to receive, at the base station, a second PSRS, code to measure, at the base station, a receive chain phase drift based on the received second PSRS, code to obtain, at the base station, a transmit chain phase drift based on the first PSRS, code to determine, by the base station, a relative phase drift between a downlink channel and an uplink channel using the receive chain phase drift and the transmit chain phase drift, code to determine, by the base station, a relative coordinating phase drift among all cooperating base stations in the coordinating set of base stations, code to generate, by the base station, an uplink channel estimate based on a SRS received from a UE, and code to generate, by the base station, a downlink channel estimate based on the uplink channel estimate, the relative phase drift, and the relative coordinating phase drift.

In an additional aspect of the disclosure, an apparatus configured for wireless communication is disclosed. The apparatus includes at least one processor, and a memory coupled to the processor. The processor is configured to transmit, by a base station, a first PSRS, wherein the base station is one of a plurality of cooperating base stations in a coordinating set of base stations, to receive, at the base station, a second PSRS, to measure, at the base station, a receive chain phase drift based on the received second PSRS, to obtain, at the base station, a transmit chain phase drift based on the first PSRS, to determine, by the base station, a relative phase drift between a downlink channel and an uplink channel using the receive chain phase drift and the transmit chain phase drift, to determine, by the base station, a relative coordinating phase drift among all cooperating base stations in the coordinating set of base stations, to generate, by the base station, an uplink channel estimate based on a SRS received from a UE, and to generate, by the base station, a downlink channel estimate based on the uplink channel estimate, the relative phase drift, and the relative coordinating phase drift.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
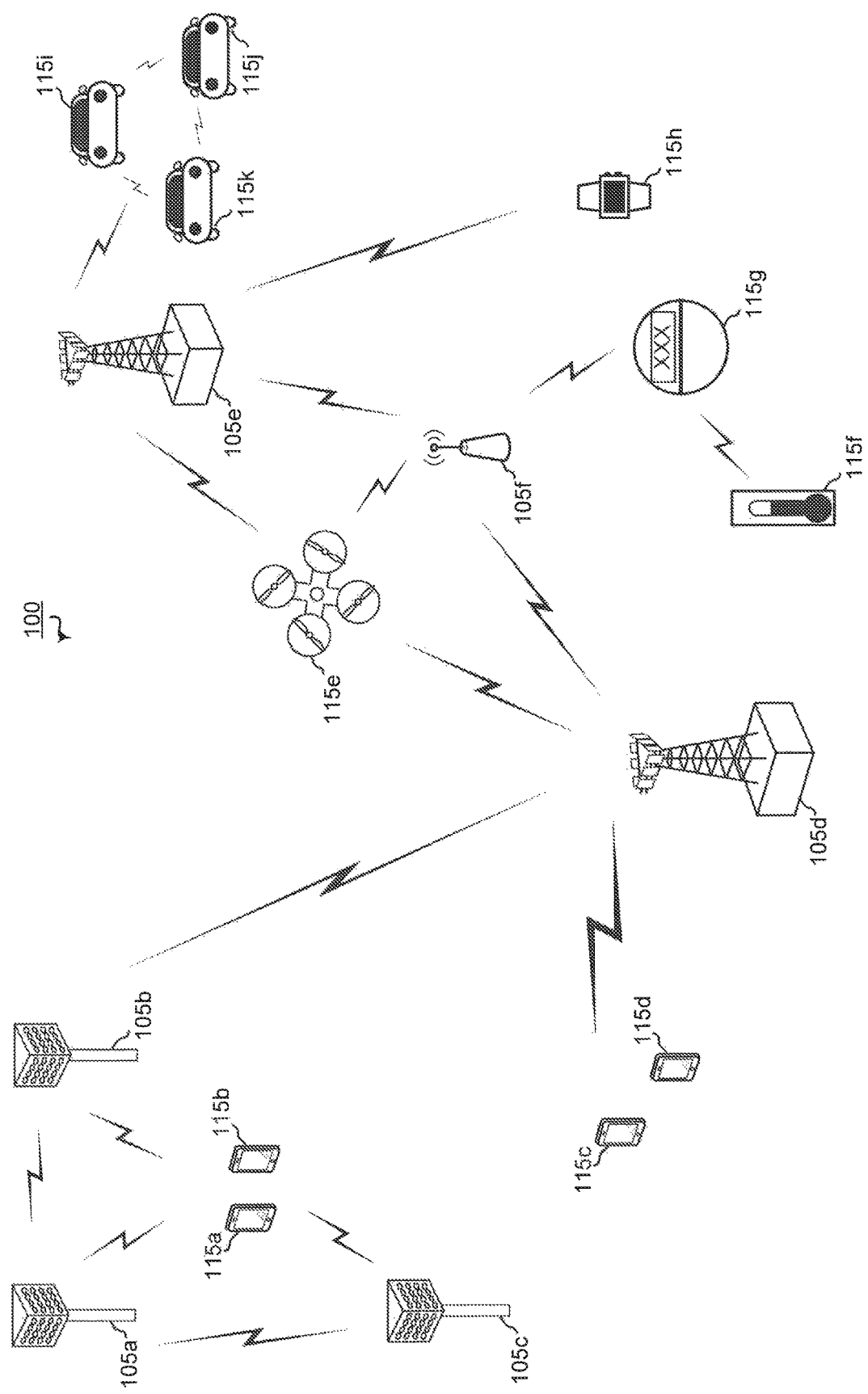
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity, eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105a-105c serve UEs 115a and 115b using 3D beamforming and coordinated spatial techniques, such as coordinated multipoint (CoMP) or multi-connectivity. Macro eNB 105d performs backhaul communications with eNBs 105a-105c, as well as small cell, eNB 105f. Macro eNB 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro eNBs 105d and 105e, as well as small cell eNB 105f. Other machine type devices, such as UE 115f (thermometer), UE 115g (smart meter), and UE 115h (wearable device) may communicate through 5G network 100 either directly with base stations, such as small cell eNB 105f, and macro eNB 105e, or in multi-hop configurations by communicating with another user device which relays its information to the network, such as UE 115f communicating temperature measurement information to the smart meter, UE 115g, which is then reported to the network through small cell eNB 105f. 5G network 100 may also provide additional network efficiency through dynamic, low-latency TDD/FDD communications, such as in a vehicle-to-vehicle (V2V) mesh network between UEs 115i-115k communicating with macro eNB 105e.

Figure 2:
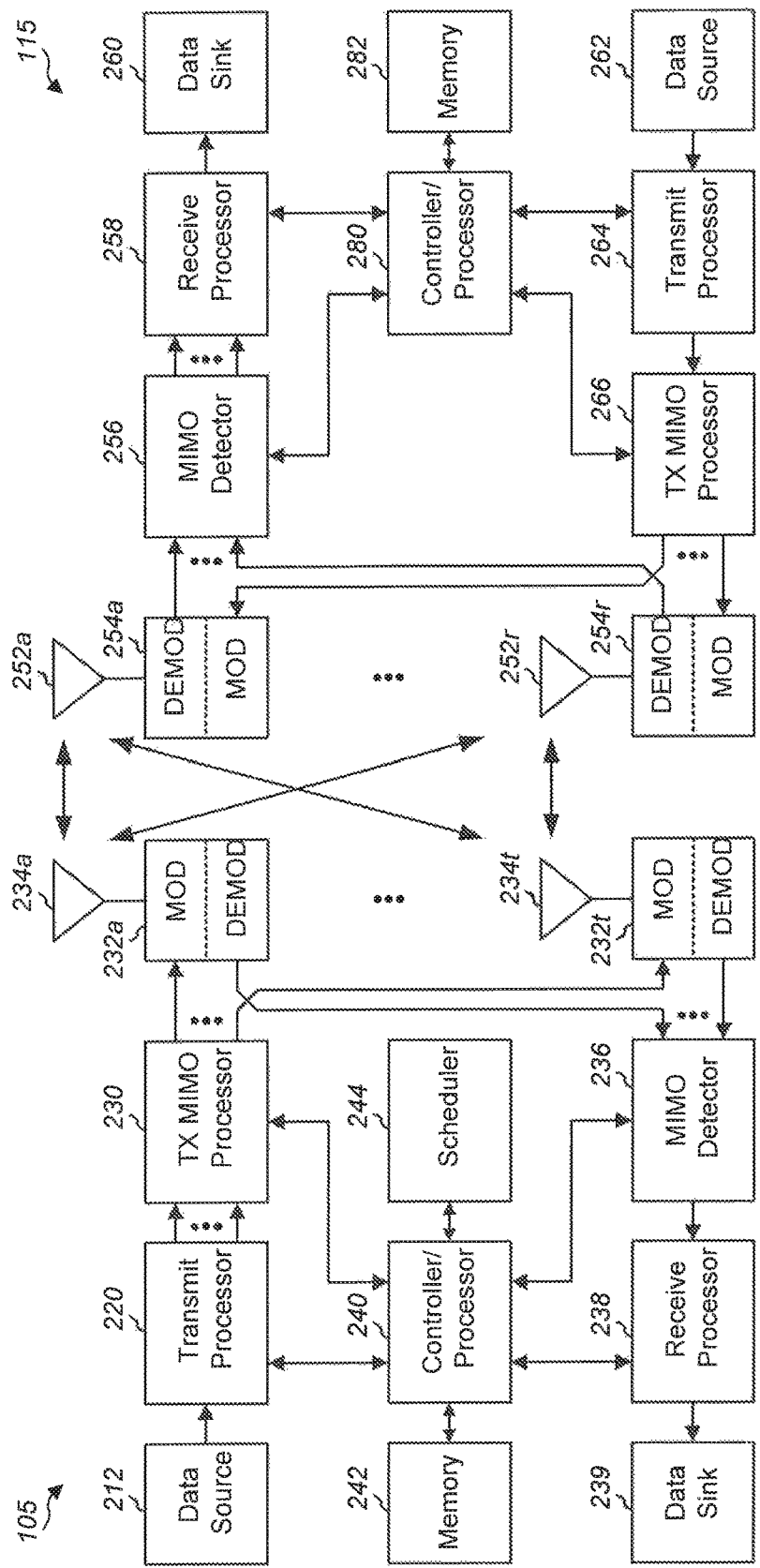
FIG. 2 is a block diagram illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. At the eNB 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 6, 7, and 10, and/or other processes for the techniques described herein. The memories 242 and 282 may store data and program codes for the eNB 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
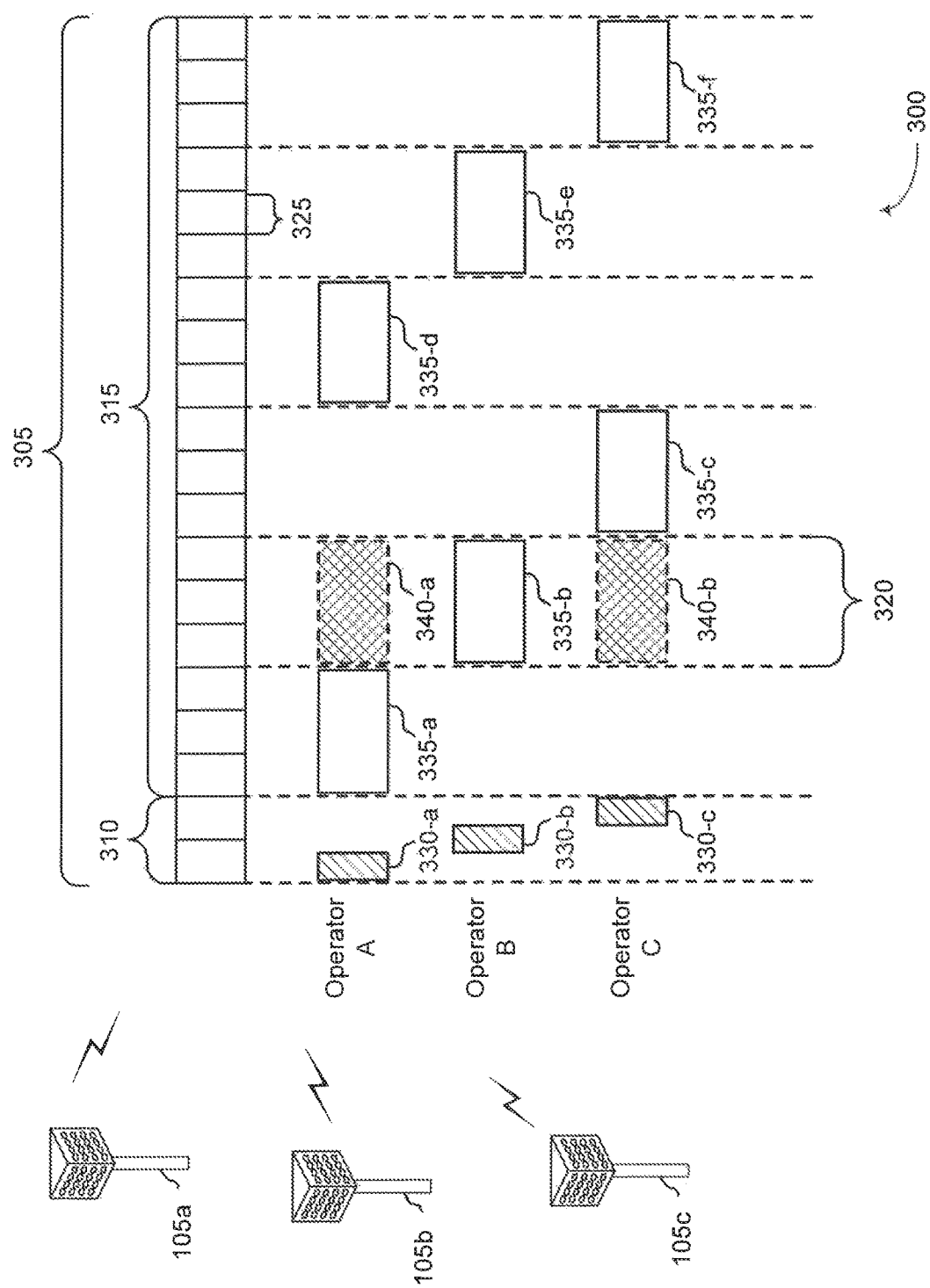
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless operations that use coordinated multipoint (CoMP) transmissions include a range of different techniques that enable the dynamic coordination of transmission and reception over a variety of different base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously processed and transmitted from multiple cooperating base stations. In heterogeneous and dense small cell network scenarios with low power nodes, UEs may experience significant signal strength simultaneously from multiple base stations. In order to manage both downlink and uplink joint transmission CoMP, accurate and up-to-date channel state information (CSI) feedback is used.

In time-division duplexing (TDD) systems, the uplink and downlink transmissions take place over the same frequency band. Therefore, when the transmissions are performed within the channel coherence time, the uplink and downlink channel states are generally the same. As a result, the downlink channel to each user ideally can be estimated in the uplink direction by base stations receiving transmission of sounding reference signals (SRS) from the user equipment (UEs). The estimated downlink channel may then be used in the design of downlink beams. However, reciprocity is not perfect. In practice, each node (eNBs and UEs) may introduce a mismatch, such as through an amplitude and/or a phase perturbation, to the transmitted/received signals because the transceiver radio frequency (RF) chains (e.g. antennas, RF mixers and filters, analog-to-digital (A/D) convertors, in-phase/quadrature (I/Q) imbalances, etc.) are not necessarily identical across different nodes/antennas. Calibration may be performed to identify the mismatch between the downlink and uplink channels and then applied on the channel estimation from the SRS transmission.

Coordinated multipoint (CoMP) is a general framework of different techniques for downlink and uplink cooperative transmissions involving multiple non-collocated eNBs or base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously processed and transmitted from multiple cooperating base stations. The various aspects of the present disclosure are directed to downlink CoMP joint transmission, in which each of the beams is transmitted from multiple geographically separated eNBs. In operation, such CoMP joint transmission generally uses centralized processing at a central eNB with fiber backhaul connections to the other coordinating eNBs. Downlink CoMP joint transmission is analogous to a large scale MIMO system with geographically distributed eNBs and UEs.

Consider N cooperating eNBs serving M UEs simultaneously.

$$\begin{bmatrix} H_{1,1} & H_{1,2} & \dots & H_{1,c} & \dots \\ H_{2,1} & H_{2,2} & \dots & H_{2,c} & \dots \\ \vdots & \vdots & \vdots & \vdots & \vdots \\ \vdots & \vdots & \ddots & \ddots & \dots \\ H_{u,1} & H_{u,2} & \dots & H_{u,c} & \dots \\ \vdots & \vdots & \vdots & \vdots & \vdots \end{bmatrix} \quad (1)$$

As an example, the beams to M UEs may be determined to maximize the SINR as follows:

$$W_{:,u} = \arg\max_{\|w\|^2 = P_s} \frac{|H_{u,:} w|^2}{1 + \sum_{u' \neq u} |H'_{u,:} w|^2} \quad (2)$$

This processes uses accurate channel knowledge for accurate beam pointing (more precisely, beam nulling toward unintended UEs).

Figure 4:
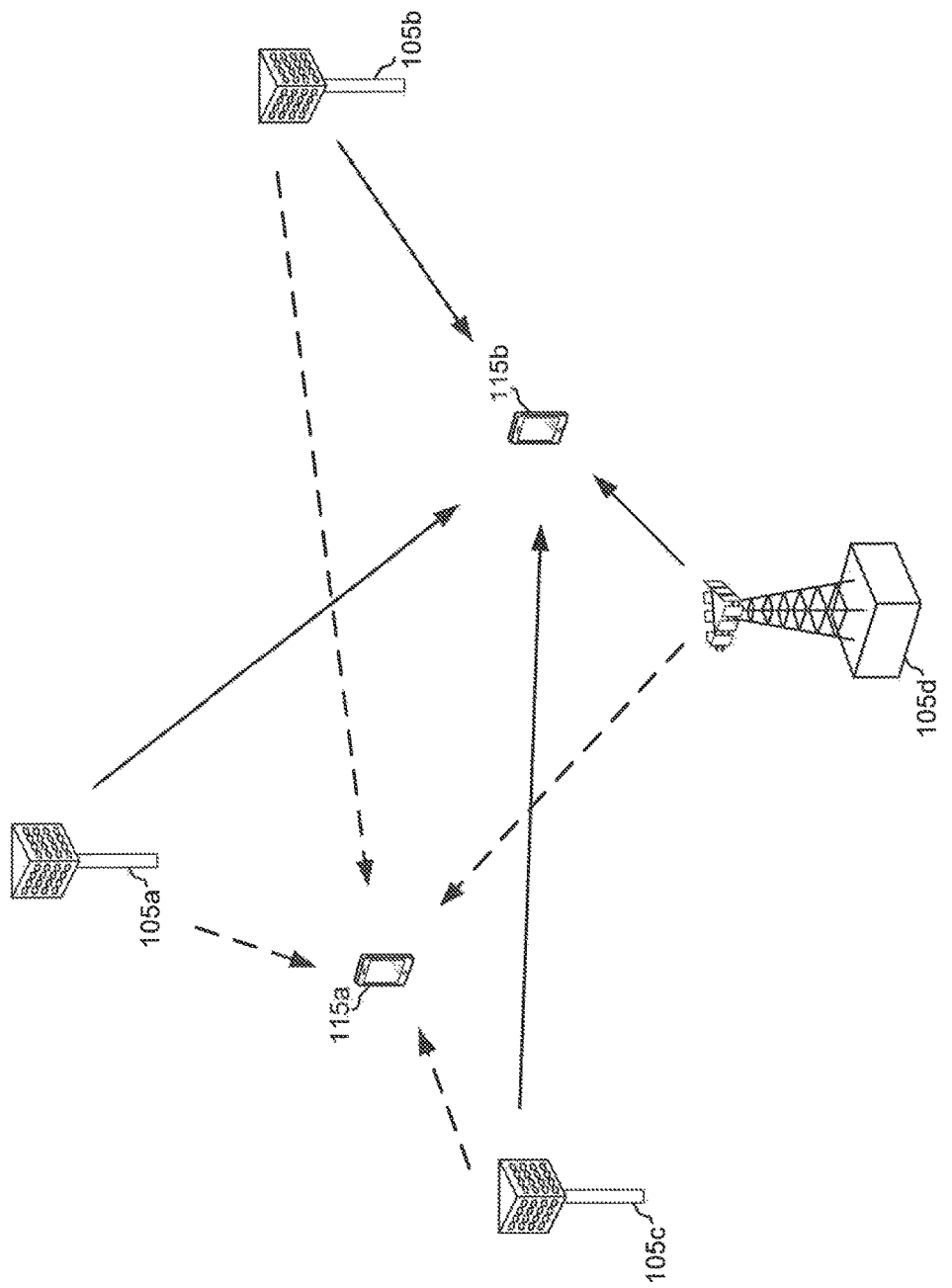
FIG. 4 is a block diagram illustrating a CoMP operation involving eNBs and a served UE.

FIG. 4 is a block diagram illustrating a CoMP operation involving eNBs 105a-105d serving UE 115b. eNBs 105a-105d form the CoMP set serving UE 115b through joint transmission. As illustrated, eNBs 105a-105d coordinate beamforming for communications in such a manner that UE 115b sees the signal. However, the beams are coordinated to nullify the net signal toward unintended UEs, such as UE 115a, as much as possible. Therefore, the combined signal from eNBs 105a-105d seen at UE 115a is very small, as the signals from eNBs 105a-105d are constructed cancel each other out at unintended UE 115a. Because of this operation, CoMP performance may be very sensitive to phase mismatch. Beam nulling (e.g., zero forcing) toward unintended UEs, such as UE 115a, imposes a very stringent requirement on phase synchronization across eNBs, such as eNBs 105a-105d. In operation, a phase error within 3 degrees ($\pi/64$ rad) may be used to deliver 20 dB SINR to most of the UEs.

For reciprocity-based schemes, calibration may be performed to determine the mismatch between the downlink and uplink channels and then applied on the channel estimation obtained based on the received SRS transmission. In non-CoMP operation, calibration would be performed within each device between different antennas, while in CoMP, calibration would be performed across all antennas of the cooperating nodes. Calibration in CoMP operations results in removal of the gain/phase mismatch between the downlink and uplink among antennas within the eNB and across the cooperating eNBs. However, despite this calibration (which calibrates the gain and phase), the phases at different eNBs may drift over time. This could be due to relative timing drift among eNBs because of clock drift, if the eNBs are not GPS-connected, or, even if eNBs are GPS-connected, there may be a random phase drift at each eNB due to electronic component dynamics (e.g., phase locked loops (PLLs), etc.). Therefore, phase synchronization may be performed regularly to achieve a short term co-phasing of eNBs.

Figure 5:
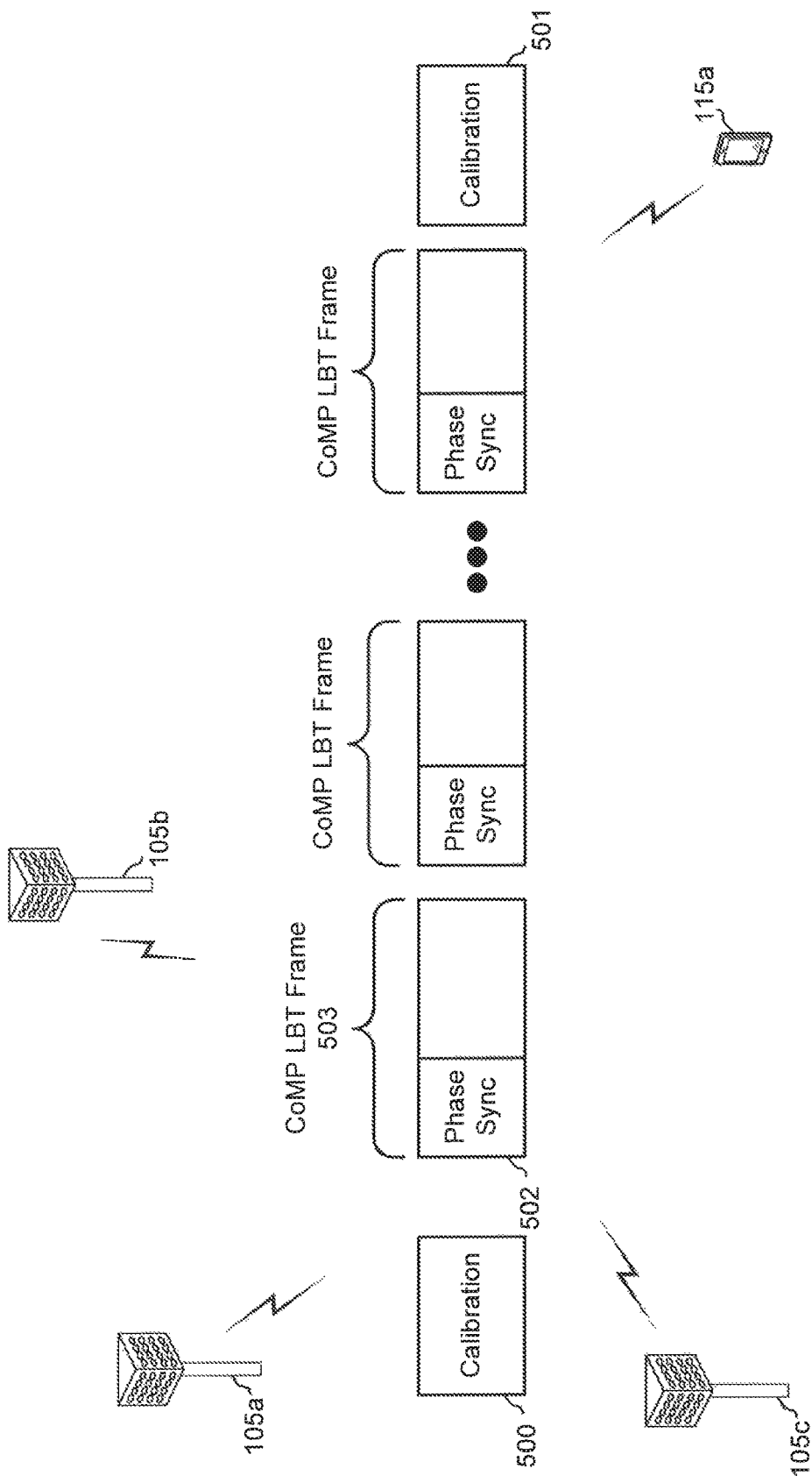
FIG. 5 is a block diagram illustrating a CoMP operation between eNBs and a served UE.

FIG. 5 is a block diagram illustrating a CoMP operation between eNBs 105a-105c and UE 115a. Calibration may be performed infrequently, while phase synchronization may be performed before each CoMP LBT frame. For example, calibration 500 and 501 occur periodically over multiple CoMP LBT frames, while phase synchronization, such as phase synchronization 502, occurs at the beginning of each CoMP LBT frame, such as CoMP LBT frame 503.

Relative timing drift between a UE and an eNB due to time-to-live (TTL) and timing adjustment (TA) may create a linear phase ramp in the frequency domain. This phase ramp may have no impact on signal-to-leakage ratio (SLR) beamforming, but it may create challenges for phase estimation, calibration, and synchronization. Clock drift across various transmission points (TPs) may create a linear phase ramp in the frequency domain (per TP) that may be corrected via phase synchronization. With regard to phase continuity, continuity may be guaranteed at an eNB, but is not necessary at a UE. Various aspects of the present disclosure are directed to performing over-the-air phase synchronization for reciprocity-based CoMP joint transmission.

Figure 6:
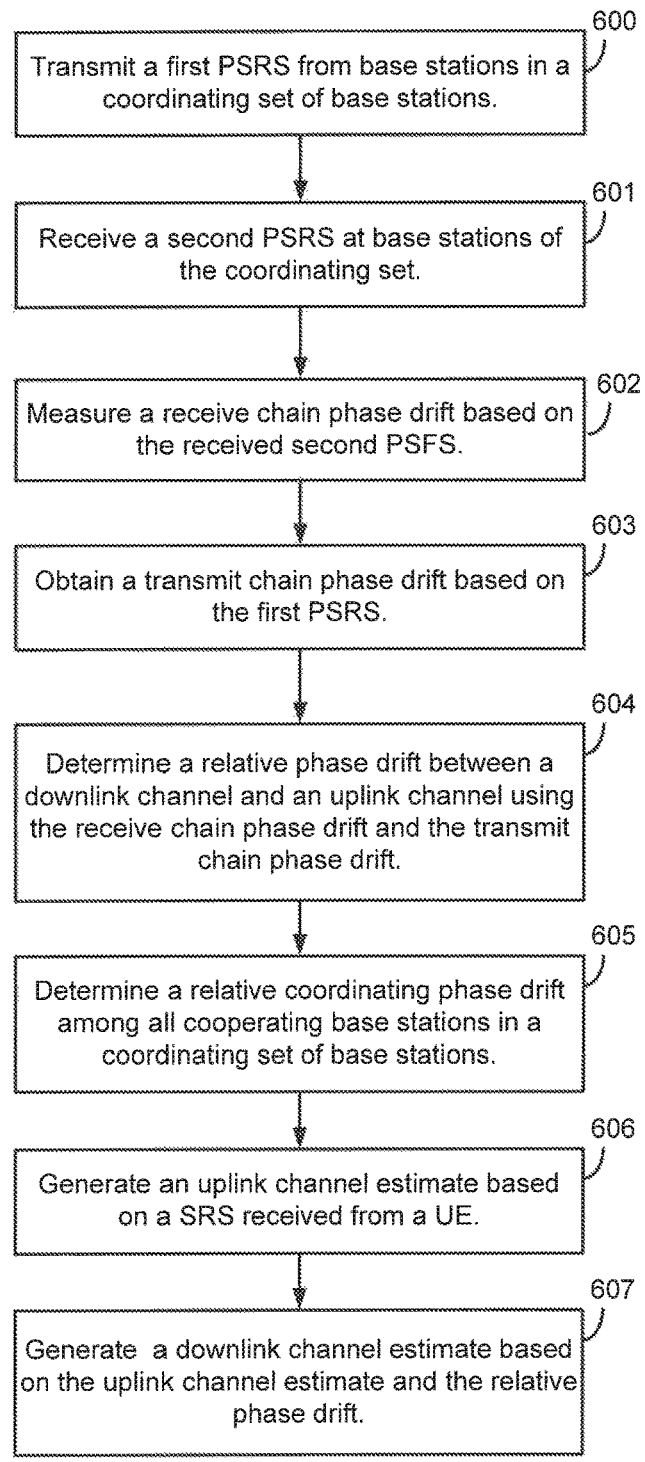
FIG. 6 is a block diagram illustrating example blocks executed to implement one aspect of the present disclosure.
Figure 13:
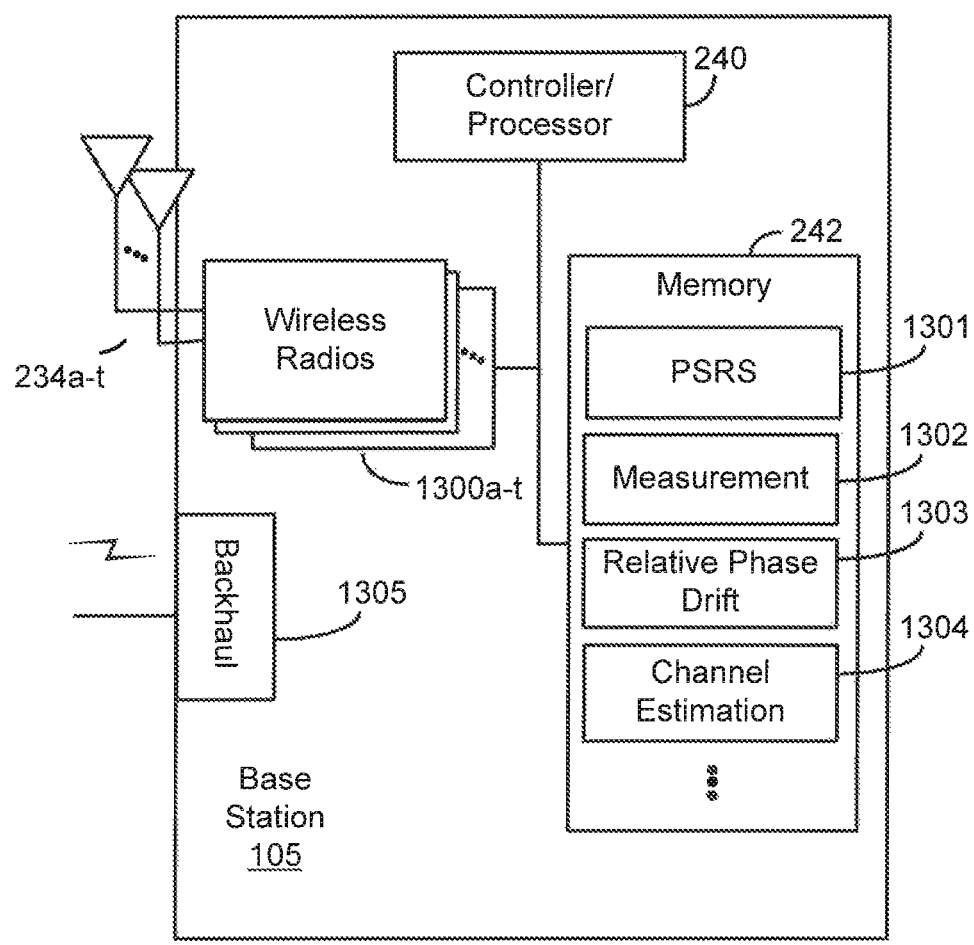
FIG. 13 is a block diagram illustrating a base station configured according to aspects of the present disclosure.

FIG. 6 is a block diagram illustrating example blocks executed to implement one aspect of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1300a-t and antennas 234a-t. Wireless radios 1300a-t includes various components and hardware, as illustrated in FIG. 2 for base station 105, including modulator/demodulators 232a-t, MIMO detector 236, receive processor 238, transmit processor 220, and TX MIMO processor 230.

At block 600, a first PSRS is transmitted from base stations of a coordinating set of base stations. For example, base station 105, under control of controller/processor 240, generates the first PSRS using PSRS logic 1301, stored in memory 242. The generated first PSRS would then be transmitted by base station 105 via wireless radios 1300a-t and antennas 234a-t. The transmission of such first PSRS will be used in determining a phase drift in the transmit chain of those base stations, including base station 105, transmitting the first PSRS.

At block 601, a second PSRS is received at base stations of the coordinating set. For example, base station 105 receives the second PSRS. The second PSRS is used by the receiving base stations, including base station 105, to determine the phase drift in the receive chain of those base stations. Depending on the aspect implemented, the second PSRS may be an uplink PSRS transmitted by a served UE (UE-assisted) and received by base station 105 via antennas 234a-t and wireless radios 1300, or may be a PSRS transmitted by another group of eNBs within the CoMP set (inter-eNB) and received via backhaul 1305 (either wired or wirelessly). In such an inter-eNB aspect, the first PSRS would be transmitted by one group of eNBs in the CoMP set different from the second group transmitting the second PSRS.

At block 602, the base station measures the receive chain phase drift based on the second PSRS. Under control of controller/processor 240, base station 105 executes measurement logic 1302, stored in memory 242. The execution environment of measurement logic 1302 allows base station 105 to measure the phase drift of the signal of the second PSRS.

At block 603, the subject base station obtains a transmit chain phase drift based on the first PSRS that it transmitted. The transmit chain phase drift may be obtained in varying ways depending on the example aspect implemented. For example, in a UE-assisted aspect, the UEs receiving the first PSRS estimate the downlink channel and may signal that downlink estimate back to base station 105 either directly through an uplink signal (e.g., PUCCH, PUSCH) or indirectly by modulating the second PSRS, which is transmitted by the UE, using the phase and/or amplitude of the downlink channel estimate. Base station would receive such transmit chain phase drift via wireless radios 1300a-t and antennas 234a-t. In another example implementing an inter-eNB aspect, the noted second group of base stations of the CoMP set receives the first PSRS and determines the downlink channel estimate that is then communicated the central base station, base station 105, of the CoMP set via backhaul 1305.

At block 604, the subject base station determines a relative phase drift between the downlink channel and the uplink channel using the receive chain and transmit chain phase drifts. For example, base station 105, under control of controller/processor 240, executes relative phase drift logic 1303, stored in memory 242. The execution environment of relative phase drift logic 1303 allows for base station 105 to determine the relative phase drift logic between the uplink and downlink channels. In the inter-eNB aspect, the central eNB, such as base station 105, collects the channel estimates from the first group of eNBs (which estimate the channel based on the second PSRS transmitted by the second group of eNBs) and the second group of eNBs (which estimate the channel based on the first PSRS transmitted by the first group of eNBs). The central eNB (e.g., base station 105) may then determine the relative phase drift between the downlink and uplink channels within the execution environment of relative phase drift logic 1303.

At block 605, the subject base station determines a relative coordinating phase drift among all cooperating base stations in a coordinating set of base stations. With the phase drifts determined between the uplink and downlink channels at the base station, a relative phase drift may then be determined among all of the base stations of the CoMP set. For example, within the execution environment of relative phase drift logic 1303, base station 105 may also use the relative phase drifts at the other base stations of the CoMP set to determine the relative coordinating phase drift. This provides information regarding the relative association among such base stations.

At block 606, the subject base station generates an uplink channel estimate based on SRS received from the served UEs, and, at block 607, generates the downlink channel estimate based on the uplink channel estimate compensated with the relative phase drift and relative coordinating phase drift. For example, base station 105, under control of controller/processor 240, executes channel estimation logic 1304, stored in memory 242, the execution environment of channel estimation logic 1304 provides the functionality to determine channel estimate for the uplink and downlink channels. When determining the uplink channel estimate using the SRS received from the served UEs, base station 105 uses the relative phase drift between all of the base stations of the CoMP set to generate the downlink channel estimate from the uplink channel estimate, thus, compensating for the phase drift and preserving the reciprocity of channels. Therefore, the phase may be synchronized through transmission, reception, and analysis of different PSRS.

A first example aspect, phase synchronization may be assisted via UE signaling (UE-assisted), while a second example aspect provides phase synchronization via signaling among the coordinating eNBs (inter-eNB). The channel estimates and phase offsets may be determined by a variety of algorithms or methods well known in wireless communications. The various aspects of the present disclosure are not limited to any single algorithm or set of algorithms for estimating the downlink and uplink channels and obtaining the phase offsets between the channel estimates.

Figure 7:
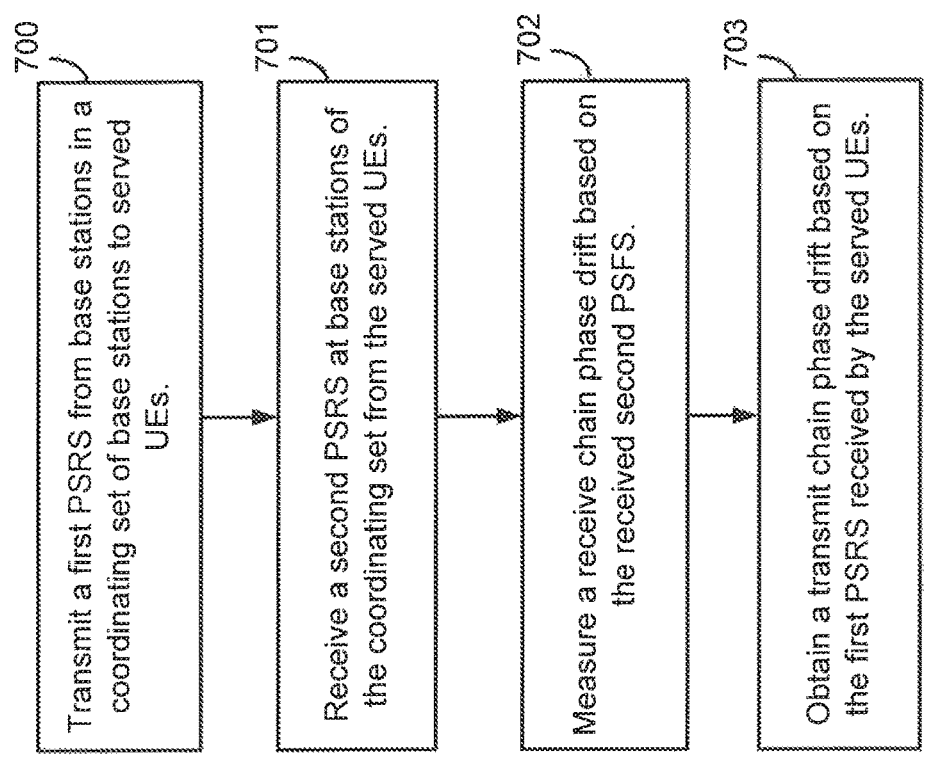
FIG. 7 is a block diagram illustrating example blocks executed to implement a UE-assisted aspect of the present disclosure.

FIG. 7 is a block diagram illustrating example blocks executed to implement a UE-assisted aspect of the present disclosure. The various operations that implement the UE-assisted aspect of the present disclosure follow the general operations described with respect to FIG. 6. The blocks described in FIG. 7 provide additional detail of the operations that are used to specifically implement the UE-assisted aspect. The example blocks will also be described with respect to base station 105 as illustrated in FIG. 13.

At block 700, the first PSRS transmitted by the base stations of a coordinating set of base stations is transmitted to served UEs. Each base station, such as base station 105, in the CoMP set transmits the first PSRS generated within the execution environment of PSRS logic 1301.

At block 701, the second PSRS received at the base stations of the coordinating set are received from the served UEs. Thus, the second PSRS is received by base station 105 from the served UEs via antennas 234*a-t* and wireless radios 1300*a-t*.

In the UE-assisted aspect, the UEs transmit the second, uplink PSRS to the base stations of the CoMP set which, at block 702, measure the receive chain phase drift based on the received second PSRS. Base station 105, thus, uses the received uplink PSRS within the execution environment of measurement logic 1302 to measure the phase drift in the receive chain.

At block 703, the base station obtains the transmit chain phase drift based on the first PSRS received by the served UEs. For example, the UEs receive the first or downlink PSRS, estimate the downlink channel based on the first PSRS and then communicate the estimated downlink channel back to base station 105. This communication of the estimated downlink channel may be made directly, such as through a reporting signal (PUCCH or PUSCH), or indirectly, such as by modulating the uplink PSRS according to the measured or detected phase and/or magnitude of the estimated downlink channel. Base station 105 would then either directly receive the estimated downlink channel or determine the estimated downlink channel through demodulation of the uplink PSRS and within the execution environment of channel estimation logic 1304. Base station 105 uses the downlink channel estimated to determine the transmit chain phase drift. Therefore, once base station 105 obtains the transmit chain phase drift, the phase may be synchronized according to the remaining blocks in FIG. 6.

Figure 8:
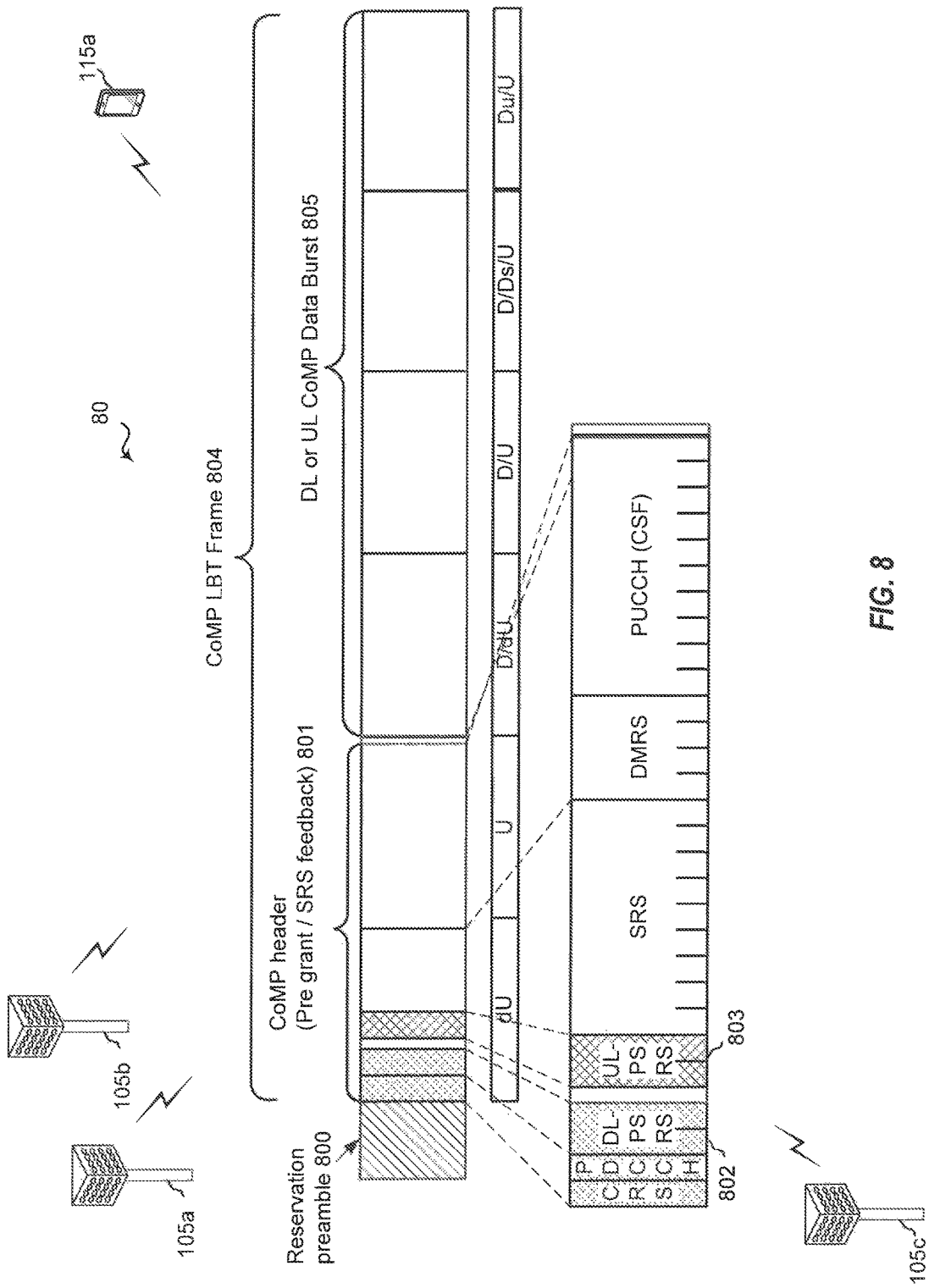
FIG. 8 is a block diagram illustrating a CoMP operation configured according to one aspect of the present disclosure.

FIG. 8 is a block diagram illustrating CoMP operation 80 configured according to one aspect of the present disclosure. CoMP operation 80 supports communications between eNBs 105*a*-105*c* and UE 115*a*. The transmission channel is reserved by eNBs 105*a*-105*c* during reservation preamble 800. An LBT procedure may be performed within reservation preamble 800 in order to secure the channel. In the UE-assisted aspect of the phase synchronization operation illustrated in FIG. 8, within CoMP header 801, eNBs 105*a*-105*c* transmit downlink phase-synchronization reference signals (DL-PSRS) 802 which enable each UE, such as UE 115*a*, to estimate the downlink channel between UE 115*a* and of each of eNBs 105*a*-105*c*. The UEs, such as UE 115*a*, would then transmit uplink (PSRS) (UL-PSRS) 803 that enable each of eNBs 105*a*-105*c* to measure the phase drift caused by the receiver chain at each eNB. eNBs 105*a*-105*c* obtain the downlink channel estimate from UE 115*a* either directly, via signaling (e.g., PUCCH, PUSCH), or indirectly, via UE 115*a* modulating UL-PSRS 803 by the estimated downlink channel phase and/or magnitude. Using this estimated downlink from UE 115*a*, eNBs 105*a*-105*c* may determine the phase drift of the transmit chain. eNBs 105*a*-105*c* may then compute an estimate of the phase drift between the downlink and uplink channel. The estimated phase drift can be applied on the uplink channel estimate determined using the SRS transmitted from UE 115*a* in order to translate the uplink channel estimate into a downlink channel estimate, thus, compensating and preserving the channel reciprocity.

In one example operation of the UE-assisted aspect, UE 115*a* may estimate the downlink channel using DL-PSRS 802 tones and then transmit the estimated downlink channel on an uplink channel (e.g., PUCCH or PUSCH) to eNBs 105*a*-105*c*. While this procedure allows eNBs 105*a*-105*c* to directly obtain an accurate downlink channel estimate from the UE, which eNBs 105*a*-105*c* may then use to determine the transmit chain phase drift, it makes use of large feedback overhead, and the processing time at the eNB to decode this PUCCH/PUSCH may ultimately delay CoMP transmission.

In another example operation of the UE-assisted aspect, UE 115*a* may estimate the downlink channel using DL-PSRS tones 802 and then use the phase and/or magnitude of the estimated channel to modulate UL-PSRS tones 803. The modulation may be a modulation using the actual phase and/or magnitude of the downlink estimate or may be a modulation using the negative of the phase observed on DL-PSRS 802 (e.g., "analog feedback") or an inverse of the downlink estimate. The subject eNB, any of eNBs 105*a*-105*c*, may then obtain the UE-determined estimated downlink channel and directly observe the net phase difference or drift between the eNB receiver and eNB transmitter chains.

As noted with the UE-assisted phase synchronization aspect, the phase synchronization may be performed at CoMP header 801 at the beginning of each CoMP LBT frame 804, including CoMP header 801 and downlink/uplink CoMP data burst 805. CoMP header 801 according to the UE-assisted aspect of the present disclosure generally contains downlink "pre-grant" SRS/channel state feedback (CSF) requests, DL-PSRS 802, and uplink "pre-grant ACK" SRS and CSF (PUCCH) responses, in addition to UL-PSRS 803. Phase synchronization by eNBs 105a-105c may be based on DL-PSRS 802 and UL-PSRS 803 contained in CoMP header 801. In operation, UE 115a may modulate UL-PSRS 803 using the channel estimates based on DL-PSRS 802 to provide an analog feedback of downlink channel estimate and transmit SRS unmodulated.

Figure 9:
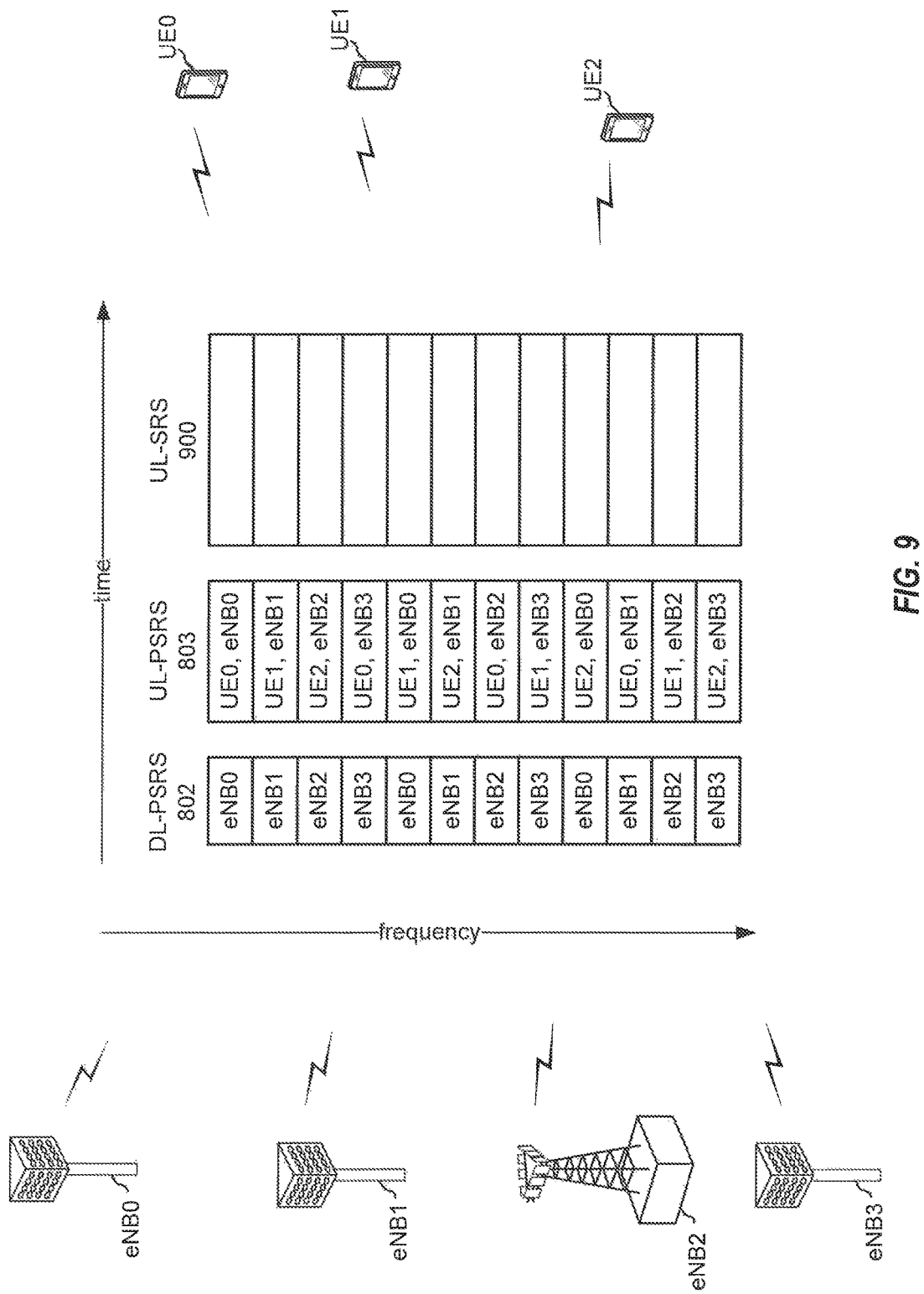
FIG. 9 is a block diagram illustrating a CoMP operation between eNBs and UEs configured according to one aspect of the present disclosure.

FIG. 9 is a block diagram illustrating a CoMP operation between eNBs 0-3 and UEs 0-2 configured according to one aspect of the present disclosure. The UE-assisted phase synchronization aspect of the present disclosure may include various options for design of the uplink and downlink PSRS. A first alternative option may include one or multiple DL-PSRS symbols 802 and, on the uplink, one UL-PSRS symbol 803 and one or multiple unmodulated SRS symbols 900. Unmodulated SRS 900 may be used to perform the downlink/uplink channel estimation. DL-PSRS 802 from different eNBs 0-3 are multiplexed in transmission, while UL-PSRS 803 from different UEs 0-2 are multiplexed in such a way that all the eNB-UE pairs are accounted for in the multiplexed transmission. In the illustrated example, there are four eNBs, eNB0-eNB3 and three UEs, UE0-UE2. In the first tone of DL-PSRS 802 and UL-PSRS 803, eNB0 transmits a DL-PSRS tone and UE0 sends a UL-PSRS tone modulated by the estimated downlink channel from eNB0. The downlink channel may be estimated using various methods, including a normalized conjugation of the estimated downlink channel from eNB0, a negative phase of the estimated downlink channel from eNB0, an inverse of the estimated downlink channel, or the like, eNB0 may then receive both uplink channel estimate and downlink channel estimate from UE0 in the same tone.

In a second optional design for UL-PSRS 803 in the UE-assisted aspect, UL-PSRS 803 are used to feed back the downlink channel estimation in order to reduce overhead. In a first alternative implementation, UEs 0-2 modulate UL-PSRS 803 with the conjugation of the normalized downlink channel estimation, while in a second alternative, UEs 0-2 modulates UL-PSRS 803 with the negate of the phase of the downlink channel estimation or, alternatively, an inverse of the downlink channel estimation.

Figure 10:
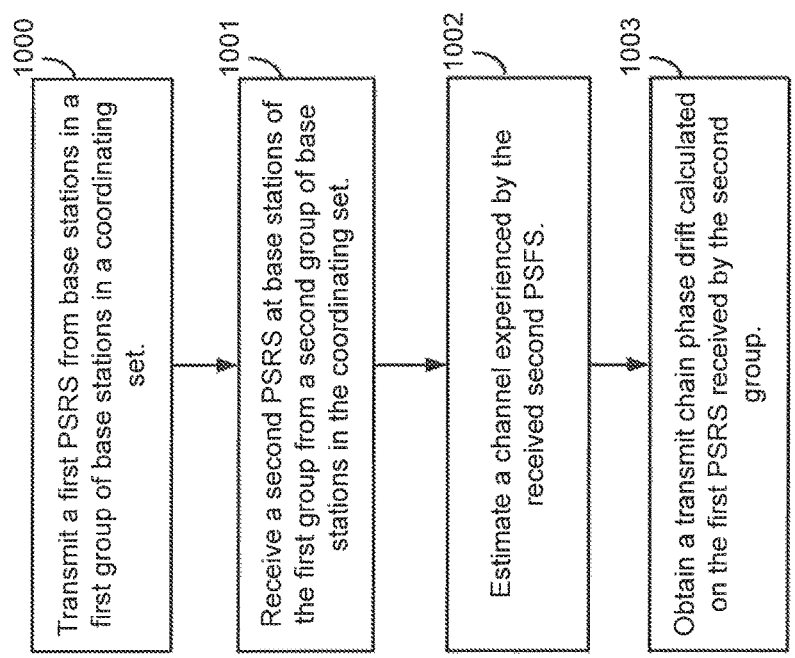
FIG. 10 is a block diagram illustrating example blocks executed to implement one aspect of the present disclosure.

FIG. 10 is a block diagram illustrating example blocks executed to implement one aspect of the present disclosure. At block 1000, a first PSRS is transmitted from base stations in a first group of base stations in a coordinating set. In a CoMP operation implemented according to the inter-eNB aspect of the present disclosure, the base stations of the CoMP set are divided into two groups. The first group, as indicated in block 1000, transmit the first PSRS.

At block 1001, the base stations of the first group receive a second PSRS from a second group of base stations in the coordinating set. At block 1002, the base stations receiving the second PSRS estimate the channel experienced by the second PSRS. The channel estimate may be communicated to a central eNB of the CoMP set.

At block 1003, the subject base stations obtain a transmit chain phase drift calculated on the first PSRS received by the second group. When the second group of base stations receive the first PSRS transmitted from the first group, the second group base stations make an estimate of the downlink channel based on the first PSRS. This downlink estimate, may be communicated to the central eNB, which collects the estimated channel from each of the base stations in the first and second groups. The central eNB may then determine the relative phase drift based on the channel estimates it collects from the other eNBs of the CoMP set.

For the inter-eNB option of the phase synchronization operation according to aspects of the present disclosure, one group of eNBs transmit PSRS for the other eNBs (inter-eNB), while a group of the other eNBs transmits PSRS to the first group of eNBs. The central eNB of the CoMP set may then compute the phase drift using the two directions of PSRS. The estimated phase drift can then be applied on the uplink channel estimate obtained using the SRS from the UEs to translate the estimated uplink channel into a downlink channel estimate. Thus, the resulting downlink channel estimate compensates for the phase drift and preserves the reciprocity between the uplink and downlink channels.

Figure 11:
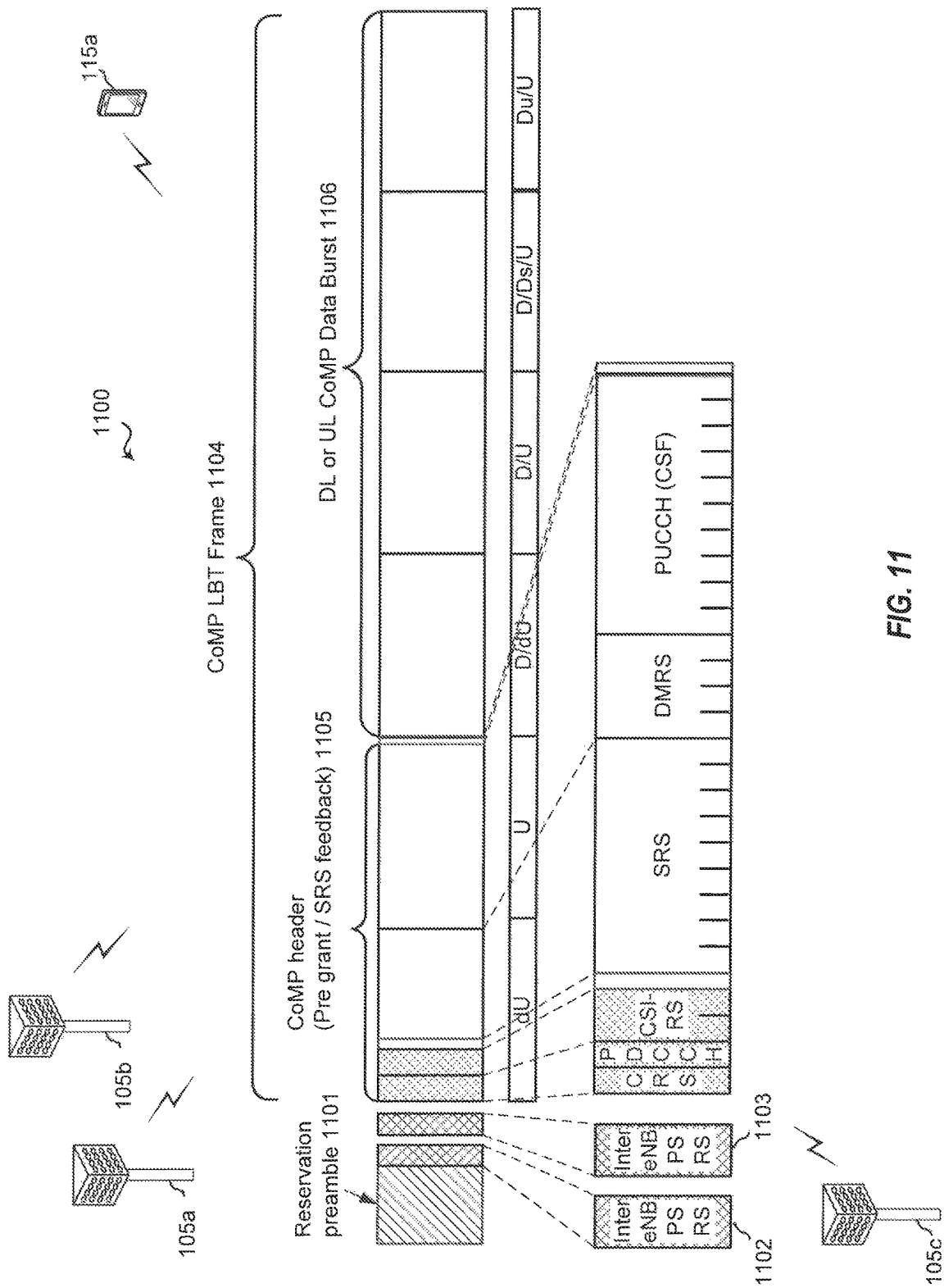
FIG. 11 is a block diagram illustrating a CoMP operation between eNBs and a UE configured according to one aspect of the present disclosure.

FIG. 11 is a block diagram illustrating a CoMP operation 1100 between eNBs 105a-105c and UE 115a configured according to one aspect of the present disclosure. According to the inter-eNB phase synchronization aspect, the phase synchronization may be also performed at CoMP header 1105 at the beginning of each CoMP LBT frame 1104. CoMP LBT frame 1104 includes both CoMP header 1105 and downlink/uplink CoMP data burst 1106. In the inter-eNB aspect, phase synchronization may be based on two-phase PSRS exchanges, Inter-eNB PSRS 1102 and 1103, among various eNBs 105a-105c of the CoMP set prior to CoMP header 1105, thus, it is transparent to UE 115a. CoMP header 1105, according to the inter-eNB aspect, may generally contain the inter-eNB phase exchange of inter-eNB PSRS 1102 and 1103, the DL "pre-grant" SRS/CSF request, CSI-RS, and the uplink "pre-grant ACK" SRS and CSF (PUCCH) response. For the inter-eNB aspect, eNBs 105a-105c of the CoMP set are divided into two groups. In each phase, one group of eNBs (e.g., 105a and 105b) transmits inter-eNB PSRS 1102, while the other group of eNBs (e.g., 105c) receives inter-eNB PSRS 1102 to estimate the channel. This second group of eNBs (e.g., eNB 105c) then sends its own inter-eNB PSRS 1103, which the first group of eNBs (e.g, eNBs 105a and 105b) may then use for determining the channel estimate. These estimates are communicated to a central eNB (e.g., one of eNBs 105a-105c) which may then determine the phase offset for the estimates on both directions/channels.

Figure 12:
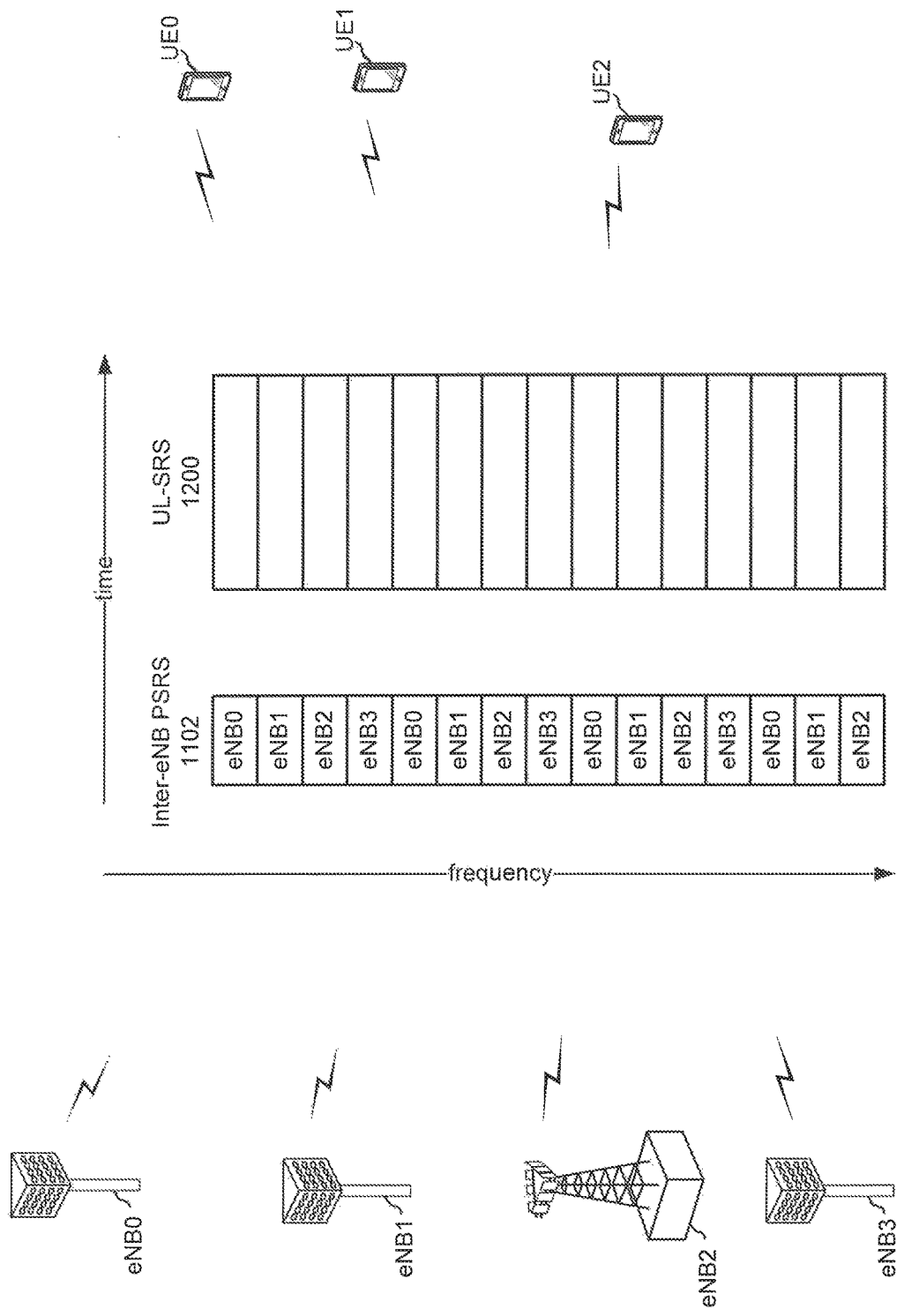
FIG. 12 is a block diagram illustrating a CoMP operation between eNBs and UEs configured according to one aspect of the present disclosure.

FIG. 12 is a block diagram illustrating a CoMP operation between eNBs 0-3 and UEs 0-2 configured according to one aspect of the present disclosure. In operation of the inter-eNB aspect, the first group of eNBs, eNBs 0-3, sends inter-eNB PSRS 1102, which the second group of eNBs (not shown) uses to estimate the channel in that direction (from the first group to the second group). This direction may be referred to, for convenience, as the "downlink" direction. The second group of the eNBs then send inter-eNB PSRS which the first group of eNBs, eNBs 0-3, use to estimate the channel in that direction (from the second group to the first group). This direction may be referred to, for convenience, as the uplink direction. The central eNB, eNB2, will then receive channels on both directions and determine the phase offset. Thus, no feedback is needed. When the phase offset has been determined, eNB2 may estimate the uplink channel based on UL-SRS 1200 received from UEs 0-2 and, may apply to phase offset of the uplink channel estimated to obtain the downlink channel estimate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6, 7, and 10 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   transmitting, by a base station, a first phase synchronization reference signal (PSRS), wherein the base station is one of a plurality of cooperating base stations in a coordinating set of base stations;
   receiving, at the base station, a second PSRS;
   measuring, at the base station, a receive chain phase drift based on the received second PSRS;
   obtaining, at the base station, a transmit chain phase drift based on the first PSRS;
   determining, by the base station, a relative phase drift between a downlink channel and an uplink channel using the receive chain phase drift and the transmit chain phase drift;
   determining, by the base station, a relative coordinating phase drift among all cooperating base stations in the coordinating set of base stations;
   generating, by the base station, an uplink channel estimate based on a sounding reference signal (SRS) received from a user equipment (UE); and generating, by the base station, a downlink channel estimate based on the uplink channel estimate, the relative phase drift, and the relative coordinating phase drift.

2. The method of claim 1,
wherein the second PSRS is received from the UE, and
wherein the obtaining the transmit chain phase drift includes obtaining the transmit chain phase drift from the UE.

3. The method of claim 2, wherein the obtaining the transmit chain phase drift from the UE includes:
receiving an uplink signal from the UE, wherein the uplink signal includes a downlink channel estimate from the UE based on the first PSRS; and
determining the transmit chain phase drift based on the downlink channel estimate from the UE.

4. The method of claim 2, wherein the obtaining the transmit chain phase drift from the UE includes:
determining a modulation of the second PSRS, wherein the modulation of the second PSRS includes on one or both of: a phase and a magnitude of a downlink channel estimate from the UE based on the first PSRS; and
determining the transmit chain phase drift using the determined modulation.

5. The method of claim 4, wherein the modulation includes one of:
a conjugate of a normalized version of the downlink channel estimate;
a negative of a phase of the downlink channel estimate; or
an inverse of the downlink channel estimate.

6. The method of claim 2,
wherein the transmitting the first PSRS includes:
multiplexing the first PSRS of the base station with one or more additional downlink PSRS transmitted from one or more other base stations of the coordinating set of base stations, and
wherein the receiving the second PSRS includes:
receiving the second PSRS multiplexed with one or more of:
one or more additional second PSRS from the UE, and
one or more additional uplink PSRS from one or more other UEs,
wherein each of the second PSRS, one or more additional second PSRS, and one or more additional uplink PSRS are modulated according to one or more of:
the downlink channel estimate, or
one or more additional downlink channel estimates determined from one of: the first PSRS or the one or more additional downlink PSRS.

7. The method of claim 1,
wherein the first PSRS is transmitted along with other first PSRS from a first group of base stations in the coordinating set of base stations, and
wherein the second PSRS is received from a second group of base stations in the coordinating set of base stations different from the first group of base stations, and
wherein the obtaining the transmit chain phase drift includes:
receiving, at the base station, a first channel estimate from the first group of base stations based on the first PSRS and a second channel estimate from the second group of base stations based on the second PSRS, wherein the base station is a central base station of the coordinating set of base stations; and
determining the relative coordinating phase drift among all base stations of the coordinating set of base stations.

8. The method of claim 7, wherein the transmitting the first PSRS includes:
multiplexing the first PSRS with the other first PSRS, and
wherein the receiving the second PSRS includes:
receiving the second PSRS multiplexed with other second PSRS from the second group of base stations.

9. An apparatus configured for wireless communication, comprising:
means for transmitting, by a base station, a first phase synchronization reference signal (PSRS), wherein the base station is one of a plurality of cooperating base stations in a coordinating set of base stations;
means for receiving, at the base station, a second PSRS;
means for measuring, at the base station, a receive chain phase drift based on the received second PSRS;
means for obtaining, at the base station, a transmit chain phase drift based on the first PSRS;
means for determining, by the base station, a relative phase drift between a downlink channel and an uplink channel using the receive chain phase drift and the transmit chain phase drift;
means for determining, by the base station, a relative coordinating phase drift among all cooperating base stations in the coordinating set of base stations;
means for generating, by the base station, an uplink channel estimate based on a sounding reference signal (SRS) received from a user equipment (UE); and
means for generating, by the base station, a downlink channel estimate based on the uplink channel estimate and the relative phase drift.

10. The apparatus of claim 9,
wherein the second PSRS is received from the UE, and
wherein the means for obtaining the transmit chain phase drift includes means for obtaining the transmit chain phase drift from the UE.

11. The apparatus of claim 10, wherein the means for obtaining the transmit chain phase drift from the UE includes:
means for receiving an uplink signal from the UE, wherein the uplink signal includes a downlink channel estimate from the UE based on the first PSRS; and
means for determining the transmit chain phase drift based on the downlink channel estimate from the UE.

12. The apparatus of claim 10, wherein the means for obtaining the transmit chain phase drift from the UE includes:
means for determining a modulation of the second PSRS, wherein the modulation of the second PSRS includes on one or both of: a phase and a magnitude of a downlink channel estimate from the UE based on the first PSRS; and
means for determining the transmit chain phase drift using the determined modulation.

13. The apparatus of claim 12, wherein the modulation includes one of:
a conjugate of a normalized version of the downlink channel estimate;
a negative of a phase of the downlink channel estimate; or
an inverse of the downlink channel estimate.

14. The apparatus of claim 10,
wherein the means for transmitting the first PSRS includes:
means for multiplexing the first PSRS of the base station with one or more additional downlink PSRS transmitted from one or more other base stations of the coordinating set of base stations, and
wherein the means for receiving the second PSRS includes:
means for receiving the second PSRS multiplexed with one or more of:
one or more additional second PSRS from the UE, and
one or more additional uplink PSRS from one or more other UEs,
wherein each of the second PSRS, one or more additional second PSRS, and one or more additional uplink PSRS are modulated according to one or more of:
the downlink channel estimate, or
one or more additional downlink channel estimates determined from one of: the first PSRS or the one or more additional downlink PSRS.

15. The apparatus of claim 9,
wherein the first PSRS is transmitted along with other first PSRS from a first group of base stations in the coordinating set of base stations, and
wherein the second PSRS is received from a second group of base stations in the coordinating set of base stations different from the first group of base stations, and
wherein the means for obtaining the transmit chain phase drift includes:
means for receiving, at the base station, a first channel estimate from the first group of base stations based on the first PSRS and a second channel estimate from the second group of base stations based on the second PSRS, wherein the base station is a central base station of the coordinating set of base stations; and
means for determining the relative coordinating phase drift among all base stations of the coordinating set of base stations.

16. The apparatus of claim 15, wherein the means for transmitting the first PSRS includes:
means for multiplexing the first PSRS with the other first PSRS, and
wherein the means for receiving the second PSRS includes:
means for receiving the second PSRS multiplexed with other second PSRS from the second group of base stations.

17. A non-transitory computer-readable medium having program code recorded thereon, the program code comprising:
program code executable by a computer for causing the computer to transmit, by a base station, a first phase synchronization reference signal (PSRS), wherein the base station is one of a plurality of cooperating base stations in a coordinating set of base stations;
program code executable by a computer for causing the computer to receive, at the base station, a second PSRS;
program code executable by the computer for causing the computer to measure, at the base station, a receive chain phase drift based on the received second PSRS;
program code executable by the computer for causing the computer to obtain, at the base station, a transmit chain phase drift based on the first PSRS;
program code executable by the computer for causing the computer to determine, by the base station, a relative phase drift between a downlink channel and an uplink channel using the receive chain phase drift and the transmit chain phase drift;
program code executable by the computer for causing the computer to determine, by the base station, a relative coordinating phase drift among all cooperating base stations in the coordinating set of base stations;
program code executable by the computer for causing the computer to generate, by the base station, an uplink channel estimate based on a sounding reference signal (SRS) received from a user equipment (UE); and
program code executable by the computer for causing the computer to generate, by the base station, a downlink channel estimate based on the uplink channel estimate and the relative phase drift.

18. The non-transitory computer-readable medium of claim 17,
wherein the second PSRS is received from the UE, and
wherein the program code executable by the computer for causing the computer to obtain the transmit chain phase drift includes program code executable by the computer for causing the computer to obtain the transmit chain phase drift from the UE.

19. The non-transitory computer-readable medium of claim 18, wherein the program code executable by the computer for causing the computer to obtain the transmit chain phase drift from the UE includes:
program code executable by the computer for causing the computer to receive an uplink signal from the UE, wherein the uplink signal includes a downlink channel estimate from the UE based on the first PSRS; and
program code executable by the computer for causing the computer to determine the transmit chain phase drift based on the downlink channel estimate from the UE.

20. The non-transitory computer-readable medium of claim 18, wherein the program code executable by the computer for causing the computer to obtain the transmit chain phase drift from the UE includes:
program code executable by the computer for causing the computer to determine a modulation of the second PSRS, wherein the modulation of the second PSRS includes on one or both of: a phase and a magnitude of a downlink channel estimate from the UE based on the first PSRS; and
program code executable by the computer for causing the computer to determine the transmit chain phase drift using the determined modulation.

21. The non-transitory computer-readable medium of claim 20, wherein the modulation includes one of:
a conjugate of a normalized version of the downlink channel estimate;
a negative of a phase of the downlink channel estimate; or
an inverse of the downlink channel estimate.

22. The non-transitory computer-readable medium of claim 17,
wherein the first PSRS is transmitted along with other first PSRS from a first group of base stations in the coordinating set of base stations, and
wherein the second PSRS is received from a second group of base stations in the coordinating set of base stations different from the first group of base stations, and
wherein the program code executable by the computer for causing the computer to obtain the transmit chain phase drift includes:
program code executable by the computer for causing the computer to receive, at the base station, a first channel estimate from the first group of base stations based on the first PSRS and a second channel estimate from the second group of base stations based on the second PSRS, wherein the base station is a central base station of the coordinating set of base stations; and program code executable by the computer for causing the computer to determine the relative coordinating phase drift among all base stations of the coordinating set of base stations.

23. An apparatus configured for wireless communication, the apparatus comprising:
at least one processor; and
a memory coupled to the at least one processor,
wherein the at least one processor is configured:
to transmit, by a base station, a first phase synchronization reference signal (PSRS), wherein the base station is one of a plurality of cooperating base stations in a coordinating set of base stations;
to receive, at the base station, a second PSRS;
to measure, at the base station, a receive chain phase drift based on the received second PSRS;
to obtain, at the base station, a transmit chain phase drift based on the first PSRS;
to determine, by the base station, a relative phase drift between a downlink channel and an uplink channel using the receive chain phase drift and the transmit chain phase drift;
to determine, by the base station, a relative coordinating phase drift among all cooperating base stations in the coordinating set of base stations;
to generate, by the base station, an uplink channel estimate based on a sounding reference signal (SRS) received from a user equipment (UE); and
to generate, by the base station, a downlink channel estimate based on the uplink channel estimate and the relative phase drift.

24. The apparatus medium of claim 23,
wherein the second PSRS is received from the UE, and
wherein the configuration of the at least one processor to obtain the transmit chain phase drift includes configuration to obtain the transmit chain phase drift from the UE.

25. The apparatus of claim 24, wherein the configuration of the at least one processor to obtain the transmit chain phase drift from the UE includes configuration of the at least one processor:
to receive an uplink signal from the UE, wherein the uplink signal includes a downlink channel estimate from the UE based on the first PSRS; and
to determine the transmit chain phase drift based on the downlink channel estimate from the UE.

26. The apparatus of claim 24, wherein the configuration of the at least one processor to obtain the transmit chain phase drift from the UE includes configuration of the at least one processor:
to determine a modulation of the second PSRS, wherein the modulation of the second PSRS includes on one or both of: a phase and a magnitude of a downlink channel estimate from the UE based on the first PSRS; and to determine the transmit chain phase drift using the determined modulation.

27. The apparatus of claim 26, wherein the modulation includes one of:
a conjugate of a normalized version of the downlink channel estimate;
a negative of a phase of the downlink channel estimate; or
an inverse of the downlink channel estimate.

28. The apparatus of claim 24,
wherein the configuration of the at least one processor to transmit the first PSRS includes configuration to multiplex the first PSRS of the base station with one or more additional downlink PSRS transmitted from one or more other base stations of the coordinating set of base stations, and
wherein the configuration of the at least one processor to receive the second PSRS includes configuration to receive the second PSRS multiplexed with one or more of:
one or more additional second PSRS from the UE, and
one or more additional uplink PSRS from one or more other UEs,
wherein each of the second PSRS, one or more additional second PSRS, and one or more additional uplink PSRS are modulated according to one or more of:
the downlink channel estimate, or
one or more additional downlink channel estimates determined from one of: the first PSRS or the one or more additional downlink PSRS.

29. The apparatus of claim 23,
wherein the first PSRS is transmitted along with other first PSRS from a first group of base stations in the coordinating set of base stations, and
wherein the second PSRS is received from a second group of base stations in the coordinating set of base stations different from the first group of base stations, and
wherein the configuration of the at least one processor to obtain the transmit chain phase drift includes configuration of the at least one processor:
to receive, at the base station, a first channel estimate from the first group of base stations based on the first PSRS and a second channel estimate from the second group of base stations based on the second PSRS, wherein the base station is a central base station of the coordinating set of base stations; and
to determine the relative coordinating phase drift among all base stations of the coordinating set of base stations.

30. The apparatus of claim 29, wherein the configuration of the at least one processor to transmit the first PSRS includes configuration to multiplex the first PSRS with the other first PSRS, and
wherein the configuration of the at least one processor to receive the second PSRS includes configuration to receive the second PSRS multiplexed with other second PSRS from the second group of base stations.

* * * * *